Nov. 2, 1971  A. J. FORAL, JR  3,616,598
METHOD AND SYSTEM FOR RECONCENTRATING LIQUID ABSORBENT
Filed Aug. 14, 1969  2 Sheets-Sheet 1

INVENTOR
ADOLPH J. FORAL JR.

INVENTOR
ADOLPH J. FORAL JR.
BY
Dunlap, Laney, Hessin & Dougherty
ATTORNEYS

United States Patent Office 3,616,598
Patented Nov. 2, 1971

3,616,598
METHOD AND SYSTEM FOR RECONCENTRATING LIQUID ABSORBENT
Adolph J. Foral, Jr., Oklahoma City, Okla., assignor to Black, Sivalls & Bryson, Inc., Kansas City, Mo.
Filed Aug. 14, 1969, Ser. No. 850,096
Int. Cl. B01d 53/14
U.S. Cl. 55—32       29 Claims

ABSTRACT OF THE DISCLOSURE

The present invention relates to methods and systems for continuously reconcentrating a solution of liquid absorbent and solute. The solution to be reconcentrated is introduced into a reconcentrator having a fuel burner and fire box assembly disposed therein. A stream of fuel is burned in the burner and fire box assembly thereby vaporizing the solute and reconcentrating the liquid absorbent. Prior to burning, the stream of fuel is passed through a jet ejector. The suction chamber of the jet ejector is connected to the reconcentrator so that vaporized solute is evacuated therefrom and the pressure therein is reduced.

BACKGROUND OF THE INVENTION

(1) Field of the invention

The present invention relates generally to methods and systems for reconcentrating liquid absorbent, and more particularly, but not by way of limitation, to methods and systems for reconcentrating a solution of liquid absorbent and solute wherein the solute is vaporized and removed from the liquid absorbent under reduced pressure conditions.

(2) Description of the prior art

Many various methods and systems for reconcentrating liquid absorbent solutions have been developed. For example, in drying natural gas containing water vapor, the gas is commonly contacted with a liquid absorbent such as an aqueous solution of glycol. Water vapor contained in the gas is absorbed in the glycol solution, and the resulting water rich solution is introduced into a reconcentrator. While passing through the reconcentrator, the absorbed water is vaporized and separated from the glycol solution so that the glycol solution may be recirculated into contact with the gas stream.

In drying gas, the liquid absorbent most commonly used is an aqueous solution of triethylene glycol. However, aqueous solutions of ethylene glycol, diethylene glycol, and tetraethylene glycol may also be used.

Two types of liquid absorbent reconcentrating systems are commonly used to reconcentrate water rich glycol solutions. In the first type, the solution of glycol absorbent and water solute is reconcentrated by the application of heat alone. That is, the water rich glycol solution is introduced into a reboiler wherein it is heated to vaporize the water absorbed therein. A fuel burner and fire box assembly disposed in the reboiler vessel provides the necessary heat. The reboiler is operated at atmospheric pressure and the vaporized water as well as quantities of gas absorbed by the glycol solution are allowed to pass from the reconcentrator system into the atmosphere. The reconcentrated glycol solution is then recirculated into contact with the gas being dehydrated. Due to the fact that glycol will decompose at elevated temperatures, aqueous solutions of glycol can be reconcentrated through the application of heat alone to a concentration of approximately 98 to 99 percent by weight without decomposition occurring.

The second type of liquid absorbent reconcentrating system commonly used is similar to the type described above except that the water rich solution of glycol is first partially reconcentrated by the application of heat, and then further reconcentrated by intimately contacting the partially reconcentrated solution with relatively dry gas. When the partially reconcentrated solution is contacted with relatively dry gas, additional water is stripped therefrom and vaporized. In this type of system the reboiler is operated at atmospheric conditions, and the relatively dry gas used to strip the solute from the partially reconcentrated solution, as well as the vaporized water and other gases are allowed to pass from the reconcentrator system into the atmosphere. In reconcentrating aqueous solutions of glycol with this type of system, concentrations as high as 99.99% by weight may be obtained without decomposing the glycol. This type of system is disclosed in U.S. Pat. No. 3,105,748 dated Oct. 1, 1963.

In both types of liquid absorbent reconcentrating systems described above, the vaporized solute, gases absorbed by the liquid absorbent solution in addition to the solute, and stripping gas (if used) are introduced into the atmosphere contributing to the pollution thereof. Furthermore, relatively large quantities of heat are required to vaporize the solute since the systems are operated at a pressure equal to or higher than atmospheric pressure, and consequently, relatively large equipment and a high consumption of fuel and/or stripping gas are required.

The present invention provides methods and systems for reconcentrating a solution of liquid absorbent and solute wherein the vaporized solute and other gases are not released to atmosphere. In addition, the present invention provides methods and systems for reconcentrating a solution of liquid absorbent and solute wherein the reconcentrator is operated at sub-atmospheric pressures thereby reducing the size of equipment required and the consumption of fuel and/or stripping gas.

SUMMARY OF THE INVENTION

The present invention is directed to a method of reconcentrating a solution of liquid absorbent and solute comprising introducing the solution into a reboiler having a fuel burner and a fire box assembly disposed therein, burning a stream of fuel in the burner and fire box assembly to vaporize the solute and reconcentrate the liquid absorbent, passing the stream of fuel through a jet ejector prior to burning the fuel, said ejector having the suction chamber thereof connected to the reboiler so that the solute and other vapors are evacuated from the reboiler and the pressure therein is reduced, and withdrawing the liquid absorbent from the reconcentrator. Systems for carrying out the method are also provided by the present invention.

It is therefore, a general object of the present invention to provide methods and systems for reconcentrating liquid absorbent.

A further object of the present invention is the provision of methods and systems for reconcentrating liquid absorbent solutions wherein the solute and other gases are prevented from entering the atmosphere and causing pollution thereof.

Yet a further object of the present invention is the provision of methods and systems for reconcentrating solutions of liquid absorbent and solute wherein the solute is vaporized and separated from the liquid absorbent at reduced pressures thereby requiring less fuel than prior art methods and systems.

Still a further object of the present invention is the provision of methods and systems for reconcentrating a liquid absorbent solution by partially reconcentrating the solution through the application of heat and further reconcentrating the solution through intimately contacting the partially reconcentrated solution with stripping gas wherein substantially less fuel and stripping gas are required as compared to prior art systems.

Another object of the present invention is the provision of systems for reconcentrating liquid absorbent solutions wherein smaller and less expensive equipment is required as compared to prior art systems.

Other and further objects, features, and advantages will be apparent from the following detailed description of presently preferred embodiments of the invention, given for the purpose of disclosure and taken in conjunction with the accompanying drawings.

DESCRIPTION OF THE PREFERRED EMBODIMENTS

Figure 1:
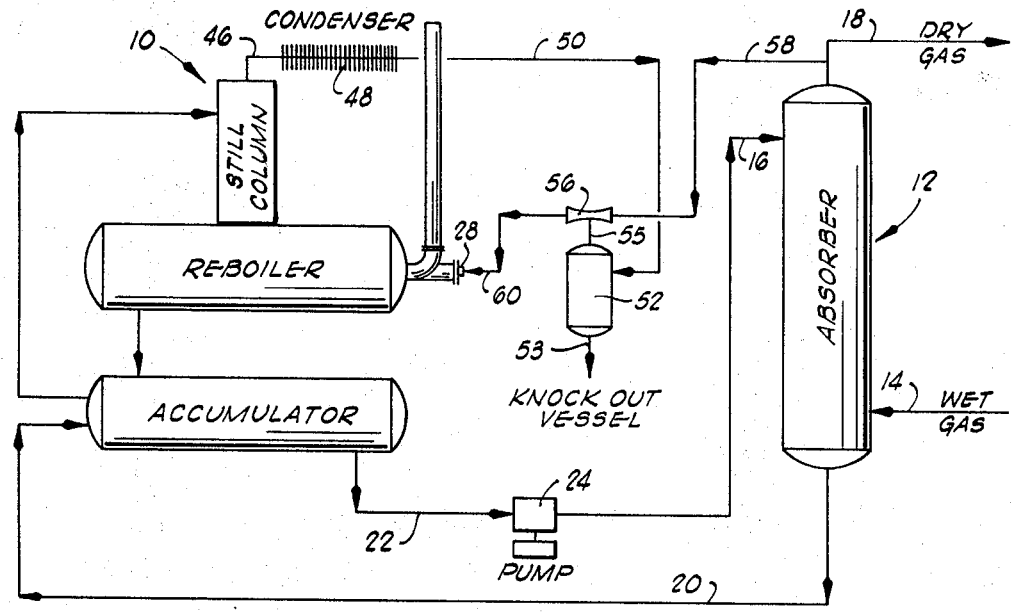
FIG. 1 is a view in diagrammatic form of a system for drying gas which includes one form of the system for reconcentrating liquid absorbent of the present invention.

Referring to FIG. 1, a system for drying gas which includes the system for reconcentrating liquid absorbent of the present invention is illustrated. The illustrated system for drying gas is similar to conventional systems in that it includes a reconcentrator system, generally designated by the numeral 10, and an absorber 12. The absorber 12 is of a conventional design, and functions to bring about intimate contact between the liquid absorbent and the gas to be dryed. Specifically, the absorber 12 may include a plurality of conventional vapor-liquid contact trays, or it may be packed with a conventional packing material, to bring about intimate contact between the liquid absorbent passing downwardly therein and the gas passing upwardly therein. The absorber 12 is operated at a pressure as high as possible in that the quantity of water which may be absorbed by a given quantity of liquid absorbent increases with increasing pressure.

The wet gas to be dried enters the absorber 12 through a conduit 14 at or near the bottom portion of absorber 12. Reconcentrated liquid absorbent enters the absorber 12 through a conduit 16 at or near the top of absorber 12. The liquid absorbent passes downwardly in the absorber 12 over the vapor-liquid contact trays or packing disposed therein contacting the wet gas as it passed upwardly therein. Water vapor contained in the gas is absorbed in the liquid absorbent, and the dry gas reaching the top of absorber 12 passes out of absorber 12 through a conduit 18. The solution of liquid absorbent having water from the gas absorbed therein accumulates in the bottom portion of absorber 12, and passes out of absorber 12 through a conventional liquid level controller and pressure reducing apparatus (not shown) into conduit 20. Conduit 20 leads the water rich solution of liquid absorbent to the reconcentrator system 10 wherein the water solute is vaporized and separated from the liquid absorbent thereby reconcentrating it. The reconcentrated liquid absorbent passes out of the reconcentrator system 10 through a conduit 22 into a pump 24. The pump 24 elevates the pressure of the reconcentrated liquid absorbent and forces it through conduit 16 back into absorber 12. Thus, the liquid absorbent solution is continuously circulated through the absorber 12 wherein water is absorbed in the liquid absorbent solution at a relatively high pressure, and through the reconcentrator system 10 at a relatively low pressure wherein the water solute contained in the absorbent solution is vaporized and separated from the absorbent solution thereby reconcentrating it.

A stream of fuel gas which may be a portion of the stream of dry gas passing out of absorbent 12 into conduit 18 passes into a conduit 58. Conduit 58 leads the stream of fuel gas to the operating stream inlet of a jet ejector 56 which will be described further hereinbelow. The suction chamber of jet ejector 56 is connected by a conduit 55 to the vapor outlet connection of a water knockout vessel 52. The inlet connection of water knockout vessel 52 is connected by a conduit 50 to a condenser 48 which is in turn connected to the water and other vapor outlet connection of reconcentrator 10 by a conduit 46. The discharge connection of the ejector 56 is connected to a fuel gas burner 28. As will be described in greater detail below, the stream of fuel gas passing through the jet ejector 56 causes water and other vapors generated in the reconcentrator system 10 to be evacuated therefrom and the pressure therein reduced to a level below atmospheric pressure. The water vapor is condensed in condenser 48 and removed from water knockout 52 through a conduit 53. Vapors accumulating in water knockout 52 are mixed with the stream of fuel gas in jet ejector 56 and are burned with the fuel gas in burner assembly 28. Thus, reconcentrator 10 is caused to operate at a reduced pressure by the operation of the fuel gas jet ejector 56. Since the amount of heat required for vaporizing the water absorbed in the liquid absorbent and the size of reconcentrator equipment required decrease with decreasing pressure, the pesent invention provides a system for reconcentrating liquid absorbent which is more economical to install and operate than prior art systems. Furthermore, since the water and other vapors liberated from the liquid absorbent in the reconcentrator system 10 are disposed of or burned with the fuel gas, only products of combustion are liberated to the atmosphere thereby preventing the pollution thereof.

As will be understood by those skilled in the art, a variety of systems other than the system illustrated in FIG. 1, are commonly used for drying gas or for preventing the formation of hydrates in gas streams containing water. For example, a liquid absorbent solution is commonly injected into a gas stream prior to refrigerating the gas stream for the purpose of recovering liquid hydrocarbons therefrom to prevent the formation of hydrates in the refrigeration equipment. In this and other systems, the liquid absorbent containing water or other solute is separated from the gas stream, reconcentrated, and the reconcentrated liquid absorbent recirculated back into contact with the gas stream. Thus, the system for reconcentrating liquid absorbent of the present invention may be employed in any of a variety of systems for drying gas streams, preventing the formation of hydrates in gas streams, etc.

Figure 2:
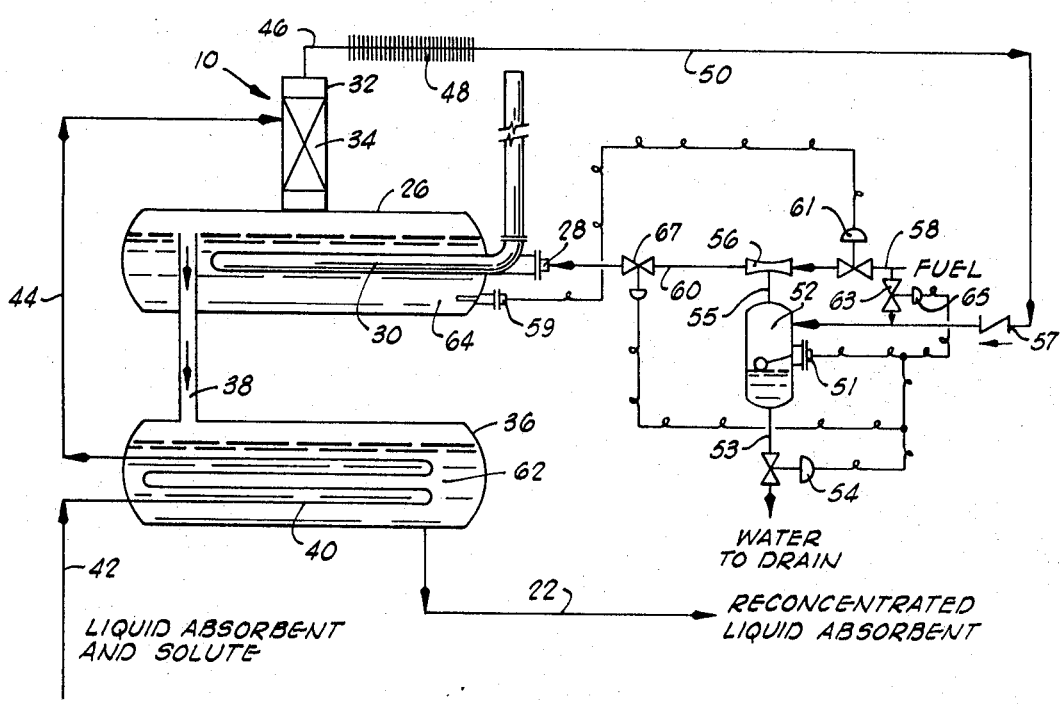
FIG. 2 is a view in diagrammatic form of the system for reconcentrating liquid absorbent of FIG. 1.

Referring now to FIG. 2, the reconcentrator system 10 of FIG. 1 is illustrated in detail. The reconcentrator system 10 basically comprises a reboiler 26 having a conventional fuel burner 28 and fire box 30 disposed therein for providing heat to a body of liquid absorbent 64 contained therein. In addition, the reboiler 26 includes a conventional still column 32 having a section 34 thereof equipped with conventional vapor-liquid contact trays, or packed with conventional packing material, to bring about intimate contact between vapors passing upwardly therethrough and liquid absorbent passing downwardly. An accumulator 36 is disposed below the reboiler 26, and is connected to the reboiler 26 by a conduit 38. Conduit 38 extends vertically a distance within reboiler 26 as illustrated in FIG. 2 so that a level of liquid absorbent is maintained in reboiler 26 above the fire box 30.

A conventional heat exchanger coil 40 is disposed within the accumulator 36. A conduit 42 is connected to the inlet of heat exchanger coil 40, and a conduit 44 is connected between the outlet of heat exchanger coil 40 and an inlet connection near the top of still column 32. A conduit 46 is connected to a vapor outlet connection in the top of still column 32, and to a conventional condenser 48. Condenser 48 may be any conventional cooling apparatus, either atmospheric or mechanical, which will bring about condensation of the water or other solute vapors passing through conduit 46. A conduit 50 is connected to the outlet of condenser 48 and to the inlet connection of a conventional liquid knock-out vessel 52. A conventional check valve 57 is disposed in conduit 50 upstream of knock-out vessel 52.

Liquid knock-out vessel 52 is equipped with a conventional liquid level controller 51. Liquid level controller 51 may be any conventional pneumatic or electric liquid level control assembly which will function to generate a pneumatic or electric signal proportional to the level of liquid within knock-out vessel 52. A pneumatically or electrically actuated control valve 54 is disposed in a conduit 53 which is connected to the liquid outlet connection of liquid knock-out 52. The actuator of control valve 54 opens or closes control valve 54 in accordance with the signal generated by liquid level controller 51. A vapor outlet connection disposed in the top of liquid knock-out 52 is connected by a conduit 55 to the suction chamber of the jet ejector 56. A source of dry gas is connected to the operating stream inlet of jet ejector 56 by a conduit 58, and the discharge connection of jet ejector 56 is connected to burner 28 by conduit 60. A conduit 63 is connected between conduits 58 and 50, and a conventional pneumatically or electrically actuated control valve 65 is disposed in conduit 63. Another pneumatically or electrically actuated control valve 67 is disposed in conduit 60. The actuators of control valves 65 and 67 open or close control valves 65 and 67 in accordance with the signal generated by liquid level controller 51.

A conventional pneumatic or electric temperature controller 59 is attached to the reboiler 26 to sense and control the temperature of the body of liquid absorbent 64 therein. The temperature controller 59 operates a conventional fuel gas control valve 61 disposed in conduit 58.

OPERATION OF RECONCENTRATOR SYSTEM 10

In operation, a stream of liquid absorbent and solute to be reconcentrated passes through conduit 42 into heat exchanger coil 40 disposed within accumulator 36. A body of hot reconcentrated liquid absorbent 62 is maintained in accumulator 36, and heat is transferred to the relatively cool liquid absorbent and solute passing through the heat exchanger coil 40 from the hot body of reconcentrated liquid absorbent 62. The thus pre-heated liquid absorbent and solute solution passes out of heat exchanger coil 40 into conduit 44 from where it is conducted to still column 32. From still column 32 the liquid absorbent and solute pass by gravity into reboiler 26 forming the body of liquid absorbent and solute 64 therein.

A stream of fuel, which may be either liquid or gas, passes through conduit 58, through the operating inlet and discharge connection of jet ejector 56, and through conduit 60 into burner 28. The fuel is burned in burner 28 and fire box 30 thereby providing heat to the body of liquid absorbent and solute 64 maintained in the reboiler 26. The temperature controller 59 and control valve 61 function to maintain the flow of fuel to the burner 28 in proportion to a preselected temperature of the body of liquid absorbent and solute 64 in reboiler 26. As the body of liquid absorbent and solute 64 is heated, the solute contained therein is vaporized and other gases absorbed by the liquid absorbent solution are liberated.

The other gases liberated from the absorbent solution in the reboiler 26 are small quantities of some of the components contained in the gas stream contacted by the liquid absorbent. For example, in applications for drying gas or preventing hydrates from forming in gas streams, the liquid absorbent (generally an aqueous glycol solution) contacts the gas stream at a relatively high pressure. In addition to water, the liquid absorbent absorbs small quantities of other components contained in the gas stream such as methane and ethane. These gases are liberated in the reboiler 26 due to the pressure reduction when the liquid absorbent passes into the reconcentrator system 10 and due to the heat transferred into the liquid absorbent therein.

The vaporized solute and other gases pass upwardly through packed section 34 of the still column 32 where they are contacted by liquid absorbent and solute passing downwardly therein. The intimate contact between the hot solute and other vapors and liquid absorbent solution achieves two desirable results. First, the hot solute and other vapors tend to strip solute from the incoming liquid absorbent solution, and second, the incoming liquid absorbent solution removes absorbent vapors carried with the solute and other vapors. In other words, still column 32 brings about clean separation of the vaporized solute and other gases from the liquid absorbent, as well as the removal of some of the solute contained in the incoming liquid absorbent solution.

The solute and other vapors pass through still column 32 into conduit 46. Conduit 46 leads the solute and other vapors into the condenser 48 wherein the vapors are cooled to the point where the solute vapors condense into a liquid. In the case where the liquid absorbent is an aqueous solution of glycol and the solute is water, the vaporized water or steam will condense at atmospheric temperatures, and consequently, an atmospheric cooler may be employed.

From cooler 48 the condensed solute and other gases pass through conduit 50 into liquid knock-out 52. The condensed solute is removed from knock-out 52 in the manner described hereinbelow by way of conduit 53 from where it is conducted to a drain, or otherwise disposed of. When the liquid level within knock-out 52 reaches a preselected level, the level controller 51 generates a signal which is received by the actuators of control valves 54, 65 and 67. This signal causes control valve 54 to open, control valve 65 to open and control valve 67 to close. The opening of control valve 65 causes relatively high pressure fuel gas to enter knock-out 52, the closing of control valve 67 prevents the fuel gas from entering the burner 28, and the opening of control valve 54 allows liquid within knock-out 52 to pass into conduit 53. The check valve 57 prevents the fuel gas from passing through conduit 50. Thus, each time the liquid level within knock-out 52 reaches a preselected level, controller 51 causes the knock-out 52 to be pressured up with fuel gas thereby forcing the liquid out of knock-out 52 through conduit 53. As will be understood by those skilled in the art, the control system described above for dumping the liquid from knock-out 52 is exemplary of one of many such control systems that may be employed in the present invention.

The vapors entering knock-out 52 pass through conduit 55 into the suction chamber of jet ejector 56 where they mix with the fuel passing therethrough. The fuel and vapors then pass into burner 28 where they are burned. The liquid absorbent passing out of still column 32 accumulates in reboiler 26 wherein it is reconcentrated in the manner described above. The reconcentrated liquid absorbent then passes out of reboiler 26 through conduit 38 into accumulator 36. While within accumulator 36 the reconcentrated liquid absorbent is cooled by exchanging heat with the incoming liquid absorbent passing through heat exchanger coil 40. The cooled reconcentrated liquid absorbent is withdrawn from accumulator 36 through conduit 22.

JET EJECTOR 56

Figure 3:
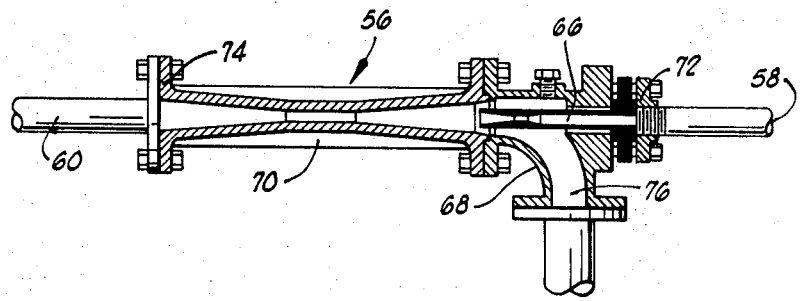
FIG. 3 is a view of conventional jet ejector apparatus employed in the system of the present invention.

Referring now to FIG. 3, jet ejector 56 is illustrated in detail. Jet ejector 56 is of conventional design basically comprising an operating stream nozzle 66 which is disposed within a suction chamber 68. A venturi shaped diffuser 70 is connected to the suction chamber 68. The conduit 58 is threaddedly secured in a flange member 72 which is attached to the operating stream nozzle 66 and to suction chamber 68. Conduit 60 is attached to the discharge connection 74 of the diffuser 70 in a conventional manner, and conduit 55 is connected to the inlet 76 of the suction chamber 68. The stream of fuel passing through the conduit 58 into the operating stream nozzle 66 is discharged in a high velocity jet across the suction chamber 68 and into the venturi shaped diffuser 70. The diffuser 70 causes the velocity energy of the fuel to be converted into pressure energy thereby reducing the pressure in the suction chamber 68. This pressure reduction in turn brings about the evacuation of suction chamber 68 and the entrainment of gas contained therein in the fuel. Thus, the fuel passing through jet ejector 56 causes the evacuation of vapors from liquid knock-out 52, conduit 50, cooler 48, conduit 46, reboiler 26 and accumulator 36 (FIG. 2). In other words, the fuel passing through ejector 56 brings about a sub-atmospheric pressure condition in the reconcentrator 10. As mentioned above, this condition is advantageous since less heat is required to vaporize the solute absorbed by the liquid absorbent at sub-atmospheric pressures than is required at atmospheric or higher pressures. In practice of the present invention, it has been found that the form of the present invention illustrated in FIG. 2 can be operated at a pressure as low as 9.4 inches of mercury through the use of a conventional jet ejector like that described above and illustrated in FIG. 3. Furthermore, instead of venting the vaporized solute and other gases from still column 32 to the atmosphere as has been the practice heretofore, the solute is condensed and disposed of, and other gases liberated from the liquid absorbent are mixed with the stream of fuel in ejector 56 and burned in burner 28. Thus, only products of combustion are released to the atmosphere by the system of the present invention. In addition to the above advantages, the system of the present invention illustrated in FIG. 2 brings about the reconcentration of aqueous glycol solutions to a higher degree of purity than comparable prior art systems. This is due to the fact that more heat can be transferred into the solution, and consequently more solute vaporized at sub-atmospheric pressures without decomposing the glycol than at atmospheric or higher pressures.

ALTERNATE FORM OF THE INVENTION

Figure 4:
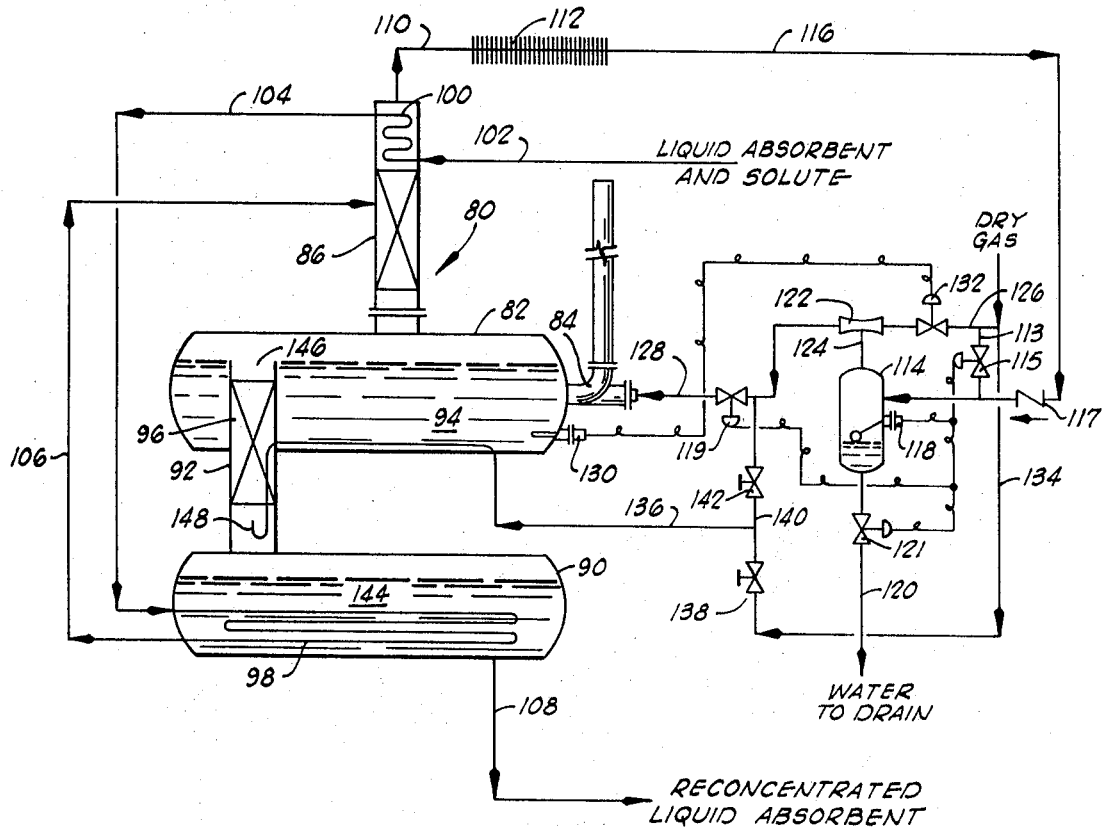
FIG. 4 is a diagrammatic view of an alternate form of the system of the present invention.

Referring now to FIG. 4, an alternate form of the present invention is illustrated generally designated by the numeral 80. The system 80 for reconcentrating liquid absorbent basically comprises a reboiler 82 having a burner and fire box assembly 84 disposed therein, and having a still column 86, of the same type as still column 32 described above, attached thereto.

An accumulator 90 is disposed below the reboiler 82, and a stripping gas column 92 is disposed between the reboiler 82 and the accumulator 90. The stripping gas column 92 extends vertically within the reboiler 82 a distance sufficient to maintain a body of liquid absorbent and solute 94 within the reboiler 82.

Stripping gas column 92 is of a conventional design and includes a section 96 therein which contains conventional vapor-liquid contact trays, or packing material, for bringing about intimate contact of liquid absorbent and solute passing downwardly therein and stripping gas passing upwardly therein.

A conventional heat exchanger coil 98 is disposed within accumulator 90, and a conventional heat exchanger coil 100 is disposed in the top portion of still column 86. Still column 86 contains a section below the heat exchanger 100 having vapor liquid contact trays or packing material disposed therein. A conduit 102 for leading the solution of absorbent and solute to be reconcentrated into the reconcentrator system 80 is connected to the inlet of heat exchanger 100. A conduit 104 is connected to the heat exchanger 100 outlet and is connected to the inlet connection of heat exchanger 98. The outlet connection of heat exchanger 98 is connected by a conduit 106 to an inlet connection near the top of still column 86. A conduit 108 is connected to an outlet connection in accumulator 90 for removing reconcentrated liquid absorbent therefrom.

A conduit 110 is connected to an outlet connection in the top portion of still column 86 and to the inlet connection of a condenser 112. The outlet connection of condenser 112 is connected to a liquid knock-out vessel 114 by a conduit 116. A conventional check valve 117 is disposed in conduit 116.

The liquid knock-out vessel 114 includes a conventional liquid level controller 118. Liquid level controller 118 may be any conventional pneumatic or electric liquid level control assembly which will function to generate a signal proportional to the level of liquid within knock-out vessel 114. A pneumatically or electrically actuated control valve 121 is disposed in a conduit 120 which is connected to the liquid outlet connection of knock-out 114. The actuator of control valve 121 opens or closes in accordance with the signal generated by liquid level controller 118.

The vapor outlet connection of liquid knock-out 114 is connected to the suction chamber of a jet ejector 122 by conduit 124. Jet ejector 122 is of the same type as ejector 56 described above. A source of fuel gas is connected to the operating stream inlet of jet ejector 122 by a conduit 126. The discharge connection of ejector 122 is connected to the burner and fire box assembly 84 by a conduit 128. A conduit 113 is connected between conduits 126 and 116 and a conventional pneumatically or electrically actuated control valve 115 is disposed in conduit 113. Another pneumatically or electrically actuated control valve 119 is disposed in conduit 128. The actuators of control valves 115 and 119 open or close in accordance with the signal generated by liquid level controller 118.

A conventional temperature controller assembly comprised of a temperature controller 130 and a fuel control valve 132 is provided to control the rate of fuel passing through ejector 122 into the burner assembly 84 in proportion to a preselected temperature of the body of liquid absorbent and solute 94 with reboiler 82. The temperature controller 130 is disposed in reboiler 82 to sense the temperature of the body of liquid absorbent 94 in the conventional manner, and fuel control valve 132 is disposed in conduit 126. A conduit 134 is connected to the source of fuel and connected to a stripping gas conduit 136. A shut-off valve 138 is disposed in conduit 134. A conduit 140 is connected to the conduit 128 and to stripping gas conduit 136, and a shut-off valve 142 is disposed therein. The stripping gas conduit 136 passes through the shell of reboiler 82, into stripping gas column 92 and terminates in the bottom portion of stripping gas column 92.

OPERATION OF THE RECONCENTRATOR SYSTEM 80

In operation, a stream of liquid absorbent and solute to be reconcentrated is conducted through conduit 102 into heat exchanger coil 100. While within heat exchanger coil 100, heat is exchanged between the liquid absorbent and solute passing therethrough and hot solute and other vapors passing upwardly within still column 86. Heat exchanger coil 100 serves to preheat the liquid absorbent and solute to be reconcentrated, and at the same time cool the solute and other vapors passing through still column 86 thereby condensing portions of the solute which serve to reflux still column 86. From heat exchanger coil 100, the liquid absorbent and solute to be reconcentrated pass through conduit 104, into heat exchanger coil 98 disposed in accumulator 90. A body of reconcentrated liquid absorbent 144 is maintained in accumulator 90. Heat is transferred from the body of liquid absorbent 144 into the liquid absorbent and solute passing through the heat exchanger coil 98. The preheated solution of liquid absorbent and solute passes from heat exchanger coil 98 through conduit 106 into still column 86. While passing downwardly in the still column 86, the solution of liquid absorbent and solute is contacted by vapors passing upwardly therein thereby causing a portion of the solute to be stripped and vaporized. The solute and other gases generated in reboiler 82 are separated from the solution of liquid absorbent and solute in still column 86 in the conventional manner. The liquid absorbent and solute passes by gravity from still column 86 into reboiler 82 to form the body of liquid absorbent and solute 94 therein. While within reboiler 82, heat is transferred into the body of liquid absorbent and solute 94 from burner and fire box assembly 84 causing a portion of the solute to be vaporized, and the solution of liquid absorbent and solute to be partially reconcentrated. The partially reconcentrated solution of liquid absorbent and solute passes into the open end 146 of stripping gas column 92 and flows by gravity through stripping gas column 92 into accumulator 144. A stream of stripping gas, the source of which will be described further herein below, passes through stripping gas conduit 136 into the bottom portion of stripping gas column 92. The stripping gas is preheated by heat exchange with the hot body of liquid absorbent and solute 94 contained within reboiler 82. After being preheated the stripping gas passes out of the open end 148 of conduit 136 disposed within stripping gas column 92. The stripping gas flows upwardly in stripping gas column 92 thereby intimately contacting the partially reconcentrated solution of liquid absorbent and solute passing downwardly therein. The intimate contact causes additional solute to be stripped from the liquid absorbent thereby further reconcentrating the liquid absorbent. The stripped and vaporized solute and stripping gas pass through stripping gas column 92 into reboiler 82 where they mix with vaporized solute and other gases therein.

The reconcentrated liquid absorbent passing out of stripping gas column 92 accumulates into the body of reconcentrated liquid absorbent 144 in accumulator 90. As previously described, heat is transferred from the body of liquid absorbent 144 into the incoming solution of liquid absorbent and solute passing within heat exchanger coil 98 thereby cooling the liquid absorbent in accumulator 90. The thus cooled reconcentrated liquid absorbent passes out of accumulator 90 through conduit 108 to a pump (not shown) or other point of use.

A stream of dry fuel gas is conducted from a source thereof through conduit 126, control valve 132 and conduit 124 into the operating stream inlet of jet ejector 122. While within jet ejector 122 the fuel gas mixes with vapors passing through conduit 124 from knock-out vessel 114, and the mixture passes through conduit 128 into burner and fire box assembly 84. The fuel gas and other gases are burned in burner assembly 84 to provide the heat to the body of liquid absorbent and solute 94 maintained within reboiler 82.

The operation of jet ejector 122 is identical to that described above for jet ejector 56. Jet ejector 122 causes vapors accumulating within liquid knock-out 114, conduit 116, condenser 112, conduit 110, reboiler 82 and accumulator 90 to be evacuated thereby reducing the pressure therein. The stripping gas, vaporized solute, and other gases accumulating in reboiler 82 are drawn through still column 86 into conduit 110. From conduit 110 the gases and vapors pass through condenser 112 wherein the vaporized solute is condensed. Condenser 112 may be any conventional cooler, either atmospheric or mechanical. From condenser 112, the gases and condensed solute pass through conduit 116 into liquid knock-out 114. The condensed solute is withdrawn from liquid knock-out 114 through conduit 120 from where it may be conducted to a drain or otherwise disposed of in the same manner as described above for the reconcentrator system 10. That is, liquid level controller 118 opens control valves 115 and 121, and closes control valve 119 thereby causing knock-out 114 to be pressured up with fuel gas, and the liquids therein forced through conduit 120. The vapors accumulating in liquid knock-out 114 pass through conduit 124, ejector 122 and into conduit 128 as previously described.

If very highly reconcentrated liquid absorbent is desired, shut-off valve 142 disposed in conduit 140 may be closed and shut-off valve 138 disposed in conduit 134 opened. This causes a stream of dry natural gas from the dry natural gas source to pass through conduit 134, through shut-off valve 138 into stripping gas conduit 136. In this configuration, the stripping gas passes through still column 92 wherein it causes additional solute to be stripped from the partially reconcentrated liquid passing downwardly therein, through still column 86 and into liquid knock-out 114. The stripping gas and other gases not condensed in condenser 112 pass out of liquid knock-out 114 into ejector 122 where they are mixed with the dry gas passing therethrough. The total gas mixture then passes through conduit 128 into burner assembly 84 where it is burned. It has been found that in this configuration an aqueous triethylene glycol liquid absorbent solution may be reconcentrated to a purity as high as 99.97 percent by weight, and the reboiler 82 can be operated at pressures as low as 13.9 inches of mercury.

It it is desired to conserve the consumption of dry gas, and very high liquid absorbent concentrations are not required, the shut-off valve 142 disposed in conduit 140 may be opened and the shut-off valve 138 in conduit 134 closed.

In this configuration a portion of the mixture of gases passing into conduit 128 from ejector 122 are caused to pass into conduit 140 and into stripping gas conduit 136. Thus, stripping gas is recycled through stripping gas column 92, reboiler 82, liquid knock-out 114 back into stripping gas conduit 136. As will be understood, since the gases passing into the suction chamber of jet ejector 122 will be saturated with solute, the gases passing into the condiut 140 and stripping gas conduit 136 will also contain a quantity of solute, and the partially reconcentrated liquid absorbent passing through stripping gas column 92 will not be reconcentrated to as high a purity as is the case when dry gas is used. However, a smaller consumption of dry fuel and stripping gas will result. In the configuration wherein stripping gas is recycled, it has been found that an aqueous solution of triethylene glycol may be reconcentrated to a purity as high as 99.9 percent by weight, and the reboiler 82 can be operated at a pressure as low as 8.7 inches of mercury.

Thus, in the form of the invention illustrated in FIG. 4, the solution of liquid absorbent and solute to be reconcentrated is partially reconcentrated through the application of heat and further reconcentrated through intimate contact with relatively dry gas, all at sub-atmospheric pressure conditions. Additionally, the stripping gas, solute vapors, and other vapors liberated in reboiler 82 are prevented from entering the atmosphere. Furthermore, by the present invention the stripping gas may be recycled through the reconcentrator system thereby substantially reducing the consumption of dry gas as compared to similar prior art systems. As in the case of the form of the invention illustrated in FIG. 2, the size of equipment required for the form of the invention illustrated in FIG. 4 is smaller than the equipment required for comparable prior art systems due to the fact that less heat is required to reconcentrate a solution of liquid absorbent at sub-atmospheric pressures than at atmospheric or higher pressures.

The present invention, therefore, is well adapted to carry out the objects and attain the ends and advantages mentioned as well as those inherent therein. While presently preferred embodiments of the invention are given for the purpose of disclosure, numerous changes in details of construction and arrangement of parts can be made which will readily suggest themselves to those skilled in the art, and which are encompassed within the spirit of the invention disclosed herein.

What is claimed is:

1. A method of reconcentrating a solution of liquid absorbent and solute comprising the steps of:

introducing the solution into a reboiler having a fuel burner and a fire box assembly disposed therein;

burning a stream of fuel in said burner and fire-box assembly to vaporize the solute and reconcentrate the liquid absorbent;

passing said stream of fuel through a jet ejector prior to burning said fuel, said ejector having the suction chamber thereof connected to the gas outlet of a liquid knock-out vessel, the inlet of which is connected to the reboiler so that solute and other vapors are evacuated from the reboiler and the pressures therein is reduced; and withdrawing said liquid absorbent from said reboiler.

2. The method of claim 1 which is further characterized to include the step of passing said solution in heat exchange relationship with said withdrawn liquid absorbent prior to introducing said solution into said reboiler.

3. The method of claim 1 wherein said liquid solute is water.

4. The method of claim 3 which is further characterized to include the steps of:

condensing said evacuated vaporized water; and removing said condensed water thereby preventing it from entering the suction of chamber of said ejector and mixing with said stream of fuel.

5. The method of claim 4 wherein said liquid absorbent is an aqueous glycol solution.

6. The method of claim 5 wherein said aqueous glycol solution is selected from the group consisting of aqueous solutions of ethylene glycol, diethylene glycol, triethylene glycol, and tetraethylene glycol.

7. A method of reconcentrating a solution of liquid absorbent and water comprising the steps of:

introducing the solution into a reboiler having a fuel gas burner and firebox assembly disposed therein;

burning a stream of fuel gas in said burner and firebox assembly thereby heating said solution so that a portion of said water is vaporized and said liquid absorbent is partially reconcentrated;

intimately contacting the partially reconcentrated liquid absorbent with a stream of relatively dry gas so that additional water is vaporized and stripped therefrom thereby further reconcentrating the liquid absorbent;

separating the gas and vaporized water from said reconcentrated liquid absorbent;

passing a second stream of gas through a gas-jet ejector having the suction chamber thereof connected to the gas outlet of a liquid knock-out vessel, the inlet of which is connected to said reboiler, thereby causing the pressure in said reboiler to be reduced and the separated gas and water vapor to be evacuated therefrom and mixed with said second stream of gas to form said stream of fuel gas; and withdrawing the reconcentrated liquid absorbent from said reboiler.

8. The method of claim 7 which is further characterized to include the step of passing said solution in heat exchange relationship with said withdrawn reconcentrated liquid absorbent prior to introducing said solution into said reboiler.

9. The method of claim 8 which is further characterized to include the step of:

cooling said evacuated gas and water vapor so that said water vapor is condensed;

separating said condensed water from said gas; and removing said condensed water thereby preventing it from entering the suction chamber of said ejector and mixing with said fuel gas.

10. The method of claim 9 wherein said liquid absorbent is an aqueous glycol solution.

11. The method of claim 10 wherein said aqueous glycol solution is selected from the group consisting of aqueous solutions of ethylene glycol, diethylene glycol, triethylene glycol and tetraethylene glycol.

12. A method of reconcentrating a solution of liquid absorbent and water comprising the steps of:

introducing the solution into a reboiler having a fuel gas burner and firebox assembly disposed therein;

burning a first portion of a composite stream of dry natural gas in said burner and fire box assembly thereby heating said solution to vaporize a portion of said water and partially reconcentrate said liquid absorbent;

intimately contacting the partially reconcentrated liquid absorbent with a second portion of said composite stream of dry natural gas so that additional water is vaporized and stripped therefrom to further reconcentrate said liquid absorbent;

separating the second portion of gas and the vaporized and stripped water from said reconcentrated liquid absorbent;

passing a stream of dry natural gas through a gas-jet ejector having the suction chamber thereof in closed communication with said reboiler to cause the pressure therein to be reduced and the separated second portion of gas and water vapor to be evacuated therefrom;

cooling said evacuated second portion of gas and water vapor so that said water vapor is condensed;

separating said second portion of gas from said condensed water;

allowing said second portion of gas to enter said suction chamber of said ejector thereby mixing with said stream of dry natural gas to form said composite stream of dry natural gas;

withdrawing the reconcentrated liquid absorbent from said reboiler.

13. The method of claim 12 which is further characterized to include the step of passing said solution in heat exchange relationship with said withdrawn reconcentrated liquid absorbent prior to introducing said solution into said reboiler.

14. The method of claim 13 wherein said liquid absorbent is an aqueous glycol solution.

15. The method of claim 14 wherein said aqueous glycol solution is selected from the group consisting of aqueous solutions of ethylene glycol, diethylene glycol, triethylene glycol and tetraethylene glycol.

16. A system for reconcentrating a solution of liquid absorbent and liquid solute which comprises:

a reboiler having a solution inlet connection, a vapor outlet connection and a reconcentrated liquid absorbent outlet connection;

a fuel burner and fire box assembly disposed in said reboiler for providing heat to vaporize said solute and thereby reconcentrate said solution of liquid absorbent and liquid solute;

a fuel-jet ejector for evacuating said reboiler thereby reducing the pressure therein, having an operating inlet, a suction chamber inlet and a discharge connection;

connection means between said fuel-jet ejector discharge connection and said fuel burner;

a source of fuel;

connection means between said source of fuel and said fuel-jet ejector operating inlet;

a liquid knock-out vessel having an inlet connection, liquid outlet connection and a vapor outlet connection;

connection means between said reboiler vapor outlet and said knock-out vessel inlet connection; and connection means between said knock-out vessel outlet connection and said fuel-jet ejector suction chamber inlet.

17. The system of claim 16 which is further characterized to include:

a reconcentrated liquid absorbent accumulator having an inlet connection and an outlet connection;

connection means between said reconcentrated liquid absorbent outlet connection of said reboiler and said accumulator inlet connection.

18. The system of claim 17 which is further characterized to include:
   a heat exchanger for exchanging heat between reconcentrated liquid absorbent in said accumulator and said solution of liquid absorbent and solute disposed within said accumulator having an inlet connection for receiving said solution and an outlet connection; and
   connection means between said heat exchanger outlet connection and said reboiler solution inlet connection.

19. A system for reconcentrating a solution of liquid absorbent and water which comprises:
   a reboiler having a solution inlet connection, a vapor outlet connection and a reconcentrated liquid absorbent outlet connection;
   a fuel burner and fire box assembly disposed in said reboiler for providing heat to vaporize said water and thereby reconcentrate said liquid absorbent;
   a fuel-jet ejector for evacuating said reboiler to reduce the pressure therein having an operating inlet, a suction chamber inlet and a discharge connection;
   connection means between said fuel-jet ejector discharge connection and said fuel burner;
   a source of fuel;
   connection means between said source of fuel and said fuel-jet ejector operating inlet;
   a water vapor condenser having an inlet connection and an outlet connection;
   connection means between said water vapor condenser inlet connection and said vapor outlet connection of said reboiler;
   a water knock-out vessel having an inlet connection, a water outlet connection and a vapor outlet connection;
   connection means between said water vapor condenser outlet connection and said knock-out vessel inlet connection; and
   connection means between said knock-out vessel vapor outlet connection and said fuel-jet ejector suction chamber inlet.

20. The system of claim 19 which is further characterized to include:
   a reconcentrated liquid absorbent accumulator having an inlet connection and an outlet connection;
   connection means between said reconcentrated liquid absorbent outlet connection of said reboiler and said accumulator inlet connection.

21. A system of claim 18 which is further characterized to include a heat exchanger for exchanging heat between reconcentrated liquid absorbent in said accumulator and said solution of liquid absorbent and solute disposed within said accumulator, having an inlet connection for receiving said solution and an outlet connection; and
   connection means between said heat exchanger outlet connection and said reboiler solution inlet connection.

22. A system for reconcentrating a solution of liquid absorbent and water which comprises:
   a reboiler having a solution inlet connection, a vapor and gas outlet connection and a liquid absorbent outlet;
   a natural gas burner and fire box assembly disposed in said reboiler for providing heat to vaporize a portion of said water and partially reconcentrate said liquid absorbent;
   a stripping gas column for intimately contacting partially reconcentrated liquid absorbent with natural gas to further reconcentrate partially reconcentrated liquid absorbent connected to said liquid absorbent outlet of said reboiler, having a natural gas inlet connection and a reconcentrated liquid absorbent outlet connection;
   a natural gas-jet ejector for evacuating said reboiler to reduce the pressure therein, having an operating inlet, a suction chamber inlet and a discharge connection;
   connection means between said natural gas-jet ejector discharge connection and said natural gas burner;
   a source of natural gas;
   connection means between said source of natural gas and said natural gas-jet ejector operating inlet;
   connection means between said source of natural gas and the natural gas inlet connection of said stripping gas column;
   a water vapor condenser having an inlet connection and an outlet connection;
   connection means between said water vapor and gas outlet connection of said reboiler and said water vapor condenser inlet connection;
   a water knock-out vessel having an inlet connection, a water outlet connection and a gas outlet connection;
   connection means between said water condenser outlet connection and said knock-out vessel inlet connection; and
   connection means between said knock-out vessel gas outlet connection and the suction chamber inlet of said natural gas-jet ejector.

23. The system of claim 22 which is further characterized to include:
   a reconcentrated liquid absorbent accumulator having an inlet connection and an outlet connection; and
   connection means between the reconcentrated liquid absorbent outlet of said stripping gas column and said accumulator inlet connection.

24. The system of claim 22 which is further characterized to include:
   a first heat exchanger for exchanging heat between reconcentrated liquid absorbent in said accumulator and said solution of liquid absorbent and solute disposed within said accumulator, having an inlet connection for receiving said solution and an outlet connection; and
   connection means between said first heat exchanger outlet connection and said reboiler solution inlet connection.

25. The system of claim 24 which is further characterized to include:
   a second heat exchanger for exchanging heat between said water vapor and gas and said solution of liquid absorbent and solute disposed within said reboiler having an inlet connection an an outlet connection;
   connection means between said first heat exchanger inlet connection and said second heat exchanger outlet connection.

26. A system for reconcentrating a solution of liquid absorbent in water which comprises:
   a reboiler having a solution inlet connection;
   a water vapor and gas outlet connection and a liquid absorbent outlet;
   a natural gas burner and fire box assembly disposed in said reboiler for providing heat to vaporize a portion of said water thereby partially reconcentrating said liquid absorbent;
   a stripping gas column for intimately contacting partially reconcentrated liquid absorbent with natural gas to further reconcentrate the partially reconcentrated liquid absorbent connected to said liquid absorbent outlet of said reboiler, having a natural gas inlet connection and a reconcentrated liquid absorbent
   a natural gas-jet ejector for evacuating said reboiler to reduce the pressure therein having an operating inlet, a suction chamber inlet and a discharge connection;
   connection means between said natural gas-jet ejector discharge connection and said natural gas burner;
   connection means between said natural gas-jet ejector discharge connection and said natural gas inlet connection of said stripping gas column;

a source of natural gas;

connection means between said source of natural gas and said natural gas jet-ejector operating inlet;

a water vapor condenser having an inlet connection and an outlet connection;

connection means between said water vapor and gas outlet connection of said reboiler and said water vapor condenser inlet connection;

a water knock-out vessel having an inlet connection, a water outlet connection and a gas outlet connection;

connection means between said water condenser oulet connection and said knock-out vessel inlet connection; and connection means between said knock-out vessel gas outlet connection and the suction chamber inlet of said natural gas-jet ejector.

27. The system of claim 26 which is further characterized to include:

a reconcentrated liquid absorbent accumulator having an inlet connection and an outlet connection;

connection means between the reconcentrated liquid absorbent outlet connection of said stripping gas column and said accumulator inlet connection.

28. The system of claim 26 which is further characterized to include:

a first heat exchanger for exchanging heat between reconcentrated liquid absorbent in said accumulator and said solution of liquid absorbent and solute disposed within said accumulator, having an inlet connection for receiving said solution and an outlet connection; and connection means between said first heat exchanger outlet connection and said reboiler solution inlet connection.

29. The system of claim 26 which is further characterized to include:

a second heat exchanger for exchanging heat between said water vapor and gas and said solution of liquid absorbent and solute disposed in said reconcentrator, having an inlet connection and an outlet connection; and connection means between said first heat exchanger inlet connection and said second heat exchanger outlet connection.

References Cited

UNITED STATES PATENTS

| | | | |
|---|---|---|---|
| 3,105,748 | 10/1963 | Stahl | 55—32 |
| 3,119,674 | 1/1964 | Glasgow et al. | 55—32 |
| 3,318,071 | 5/1967 | Sinex | 55—32 |

REUBEN FRIEDMAN, Primary Examiner

C. N. HART, Assistant Examiner

U.S. Cl. X.R.

55—171